May 16, 1944.  J. H. ANDERSON  2,349,131
OILING DEVICE
Filed April 20, 1943
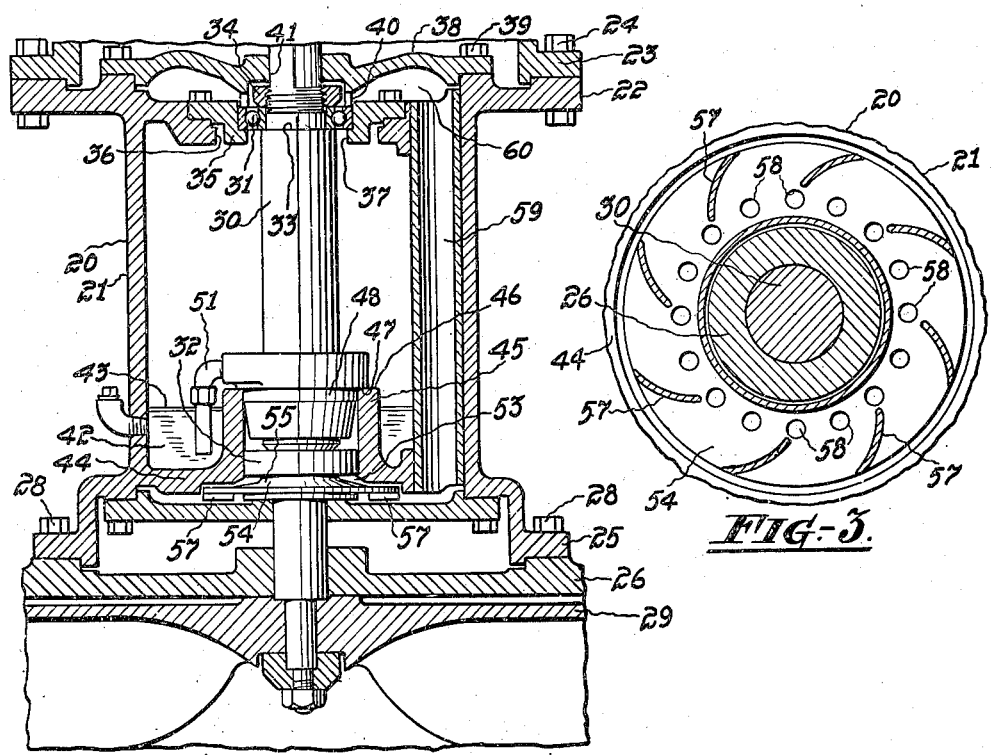
FIG.-1.
FIG.-3.
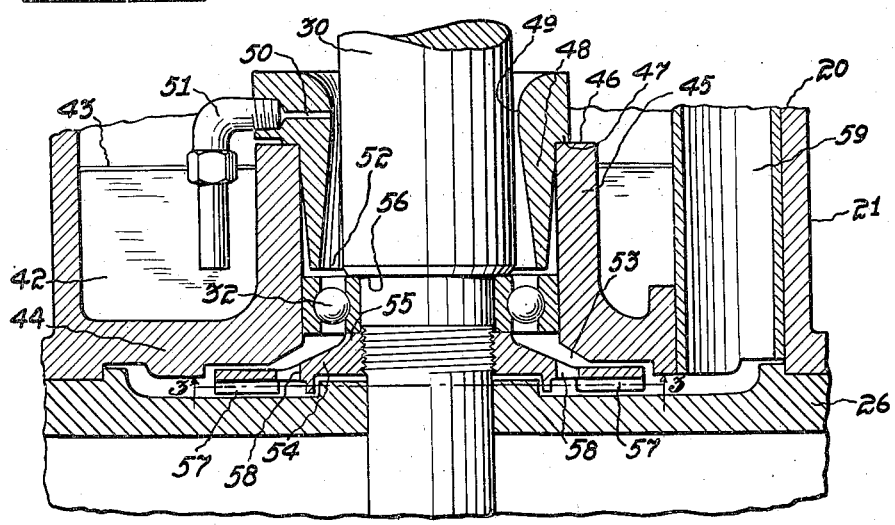
FIG.-2.
INVENTOR
James H. Anderson
BY
HIS ATTORNEY.

Patented May 16, 1944

2,349,131

UNITED STATES PATENT OFFICE 2,349,131

OILING DEVICE

James H. Anderson, Easton, Pa., assignor to Ingersoll-Rand Company, New York, N. Y., a corporation of New Jersey Application April 20, 1943, Serial No. 483,732

6 Claims. (Cl. 308—134.1)

This invention relates to oiling devices, and more particularly to an oiling device for supplying oil to the bearings of a rotary shaft.

One object of the invention is to supply an adequate amount of oil to the bearings.

Another object of the invention is to assure an immediate supply of oil to such bearings at the beginning of a period of operation of the shaft, and Still another object is to assure the delivery of oil to the bearing in a state best suited for the adequate lubrication of rotative parts operating at high rates of speed.

Other objects will be in part obvious and in part pointed out hereinafter.

In the drawing accompanying this specification and in which similar reference numerals refer to similar parts, Figure 1 is an elevation, partly in section, of a portion of a machine embodying an oiling device constructed in accordance with the practice of the invention, Figure 2 is a view similar to Figure 1 showing the oiling device and a portion of the machine somewhat enlarged, and Figure 3 is a transverse view taken through Figure 2 on the line 3—3 looking in the direction indicated by the arrows.

Referring more particularly to the drawing, the machine to which the invention is applied may, for the purpose of this description, be a turbo-blower and is designated, in general, by 20. It comprises a main casing 21 having a flange 22 at one end to which a turbine casing 23 is secured by bolts 24. The casing 21 also has a flange 25 at its opposite end to abut a blower casing 26 and these parts are secured together by bolts 28, it being understood that the blower casing 26 is suitably chambered to receive an impeller 29 and that the turbine casing 23 is intended to house a turbine wheel (not shown).

The main casing 21 may be of substantially cylindrical shape and supports a shaft 30 for the impeller 29 and the turbine wheel. The shaft extends axially through the casing and through anti-friction bearings 31 and 32 arranged in the ends of the casing.

The bearing 31 is of the thrust type and is clamped against a shoulder 33 on the shaft by a nut 34. The outer race of the bearing 31 rests in a removable plate 35 forming a cover for an opening 36 in the upper end of the casing 21. The axial opening 37 in the plate 35 below the bearing 31, and through which the shaft 30 extends, is of such diameter as to permit of free communication of the space between the races of the bearing 31 with the interior of the casing 21.

A cover 38 seated against the upper end of the casing 21 secured thereto by bolts 39 is provided on its lower surface with depending fingers 40 that seat against the upper side of the outer race of the bearing 31 for holding it fixedly within the plate 35. The cover has an axial hole 41 to permit the shaft 30 to extend therethrough.

In accordance with the practice of the invention, means are provided for supplying oil to the anti-friction bearings 31 and 32 in a form and an amount particularly well suited to assure correct lubrication of the bearings. To this end the interior of the main casing serves as a reservoir 42 for oil 43, and on the lower end wall 44 of the casing 21 is an annular flange 45 that encircles the shaft 30.

The wall 44 extends above the level of the oil 43 and its end surface constitutes a seat 46 for the flange 47 of a Venturi tube 48 arranged within the flange 45 and encircles the shaft 30 in spaced relation thereto to define an annular passageway around the adjacent portion of the shaft. The throat 49 of the Venturi tube is in the transverse plane of the flange 47, and in said flange is an orifice 50 that communicates with a tube 51 threaded to the flange 47 and having its free end extending downwardly into the oil in the reservoir 42.

In the form of the invention shown the Venturi tube 48 is of such length that its outlet end 52 lies directly adjacent the bearing 32 so that oil issuing from the Venturi tube will strike the anti-friction members of the bearing. On the opposite side of the bearing 32 and defined by the opposed end surfaces of the wall 44 and the blower casing 26 is an impeller chamber 53 containing an impeller 54 that is threadedly connected to the shaft 30 and seats with its hub 55 against the inner race of the bearing 32 for clamping the latter against a shoulder 56 on the shaft 30.

The impeller 29 is of the open type. Its vanes 57 are on the side of the impeller disc confronting the blower casing, and between the inner ends of the vanes and the hub of the impeller is a circularly arranged group of holes 58 through which fluid medium may pass to the forward portion of the impeller chamber. An outlet is provided for the impeller chamber by a passage 59 that extends through the casing 21 and opens into a chamber 60 defined by the cover 36 and the opposed surfaces of the plate 35 and the casing 21.

In the operation of the device, the impeller 54 pumps air through the channels and chambers of the machine, namely the interior of the casing 21, the Venturi tube, the impeller chamber 53, the passage 59, chamber 60 and the spaces between the fingers 40, as well as the spaces between the races of the anti-friction bearings. Owing to the differential pressures existing in the reservoir 42 and in the throat 49 of the Venturi tube oil will then flow through the orifice 50 into the zone of lower pressure within the Venturi tube and mingle with the air stream.

Such oil first passes through the anti-friction bearing 32 into the impeller chamber 53, thence through the holes 58 to the lower side of the impeller chamber. The air and entrained oil are then impelled outwardly by the vanes 57 whereby the oil particles are still further broken up and the fluid stream then passes from the impeller chamber through the passage 59, the chamber 60 and the spaces between the fingers 40 into and through the anti-friction bearing 31.

After passing through the bearing 31 the oil-laden air again passes through the reservoir 42 and through the Venturi tube from which it issues in the form of an annulus against the essential bearing surfaces of the bearing 32. In this way the bearings will be constantly supplied with oil in mist form and in the quantities necessary to assure adequate lubrication. This is a highly desirable feature since it eliminates the chances of exposing the bearings to sufficiently large quantities of oil to cause the generation of heat or undue resistance to rotation of the anti-friction members.

I claim:

1. An oiling device, comprising a casing having a passageway in the form of a Venturi tube and said passageway having an annular outlet, means for delivering oil into the throat of the passageway, a shaft in the casing, bearing means for the shaft, and rotary pump means to pump air through the passageway for admixtion with the oil and to deliver such air and oil to the bearing means.

2. An oiling device, comprising a casing having a passageway and said passageway having an annular outlet, means for delivering oil into the passageway, a rotary shaft in the casing, bearing means for the shaft coaxial with and confronting the outlet, and means on the shaft and rotatable therewith to pump air through the passageway for admixtion with the oil and to deliver the oil-laden air to the bearing means.

3. An oiling device, comprising a casing having a passageway in the form of a Venturi tube, means for delivering oil into the throat of the passageway, a rotary shaft extending through the passageway, a bearing in the casing for the shaft at the outlet end of the passageway, and an impeller on the shaft to pump air through the passageway for admixtion with the oil and to deliver the oil-laden air to the bearing.

4. An oiling device, comprising a casing having an impeller-chamber and a passageway in the form of a Venturi tube, means for delivering oil into the throat of the passageway, a shaft extending through the impeller chamber, a bearing for the shaft located between the outlet end of the passageway and the impeller-chamber, a second bearing for the shaft, means defining a passage from the impeller-chamber to the second-mentioned bearing, and an impeller in the impeller-chamber rotatable with the shaft to pump air through the passageway for admixtion with the oil therein and to pump such oil-laden air through the first-mentioned bearing, the impeller-chamber and through the passage to the second-mentioned bearing.

5. An oiling device, comprising a casing having an oil chamber and an impeller-chamber, a rotary shaft in the chambers, anti-friction bearings at the ends of the oil chamber for the shaft, a Venturi tube between the bearings encircling the shaft and having its outlet end positioned adjacent one of the bearings, means for delivering oil into the throat of the Venturi tube, means to define a passage from the impeller-chamber to the other bearing, and an impeller in the impeller-chamber rotatable with the shaft to pump air through the Venturi tube for admixtion with the oil and to pump such oil-laden air through the bearings, the passage and the oil chamber.

6. An oiling device, comprising a casing, rotary shaft in the casing, a bearing in the casing for the shaft, a Venturi tube encircling the shaft, means for delivering oil into the Venturi tube, and pump means for pumping air through the Venturi tube for admixtion with the oil and to pump the oil-laden air to the bearing.

JAMES H. ANDERSON.